United States Patent
Ng

(10) Patent No.: US 7,557,806 B2
(45) Date of Patent: Jul. 7, 2009

(54) METHOD TO PROTECT DISPLAY TEXT FROM EAVESDROPPING

(75) Inventor: Mark Ka Yau Ng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 11/363,728

(22) Filed: Feb. 28, 2006

(65) Prior Publication Data

US 2007/0200852 A1 Aug. 30, 2007

(51) Int. Cl.
*G06T 11/00* (2006.01)
*G09G 5/00* (2006.01)

(52) U.S. Cl. ...................................... 345/467; 345/626

(58) Field of Classification Search ................ 345/473, 345/629, 647
See application file for complete search history.

(56) References Cited

U.S. PATENT DOCUMENTS

| 4,320,395 A | * | 3/1982 | Meissen et al. ............. 345/685 |
| 5,970,146 A | * | 10/1999 | McCall et al. .............. 713/194 |
| 2006/0017747 A1 | * | 1/2006 | Dawson ....................... 345/629 |
| 2006/0232602 A1 | * | 10/2006 | King et al. .................. 345/611 |

OTHER PUBLICATIONS

Chang et al., "Animation: From Cartoons to the User Interface", 1993, ACM, pp. 45-55.*

"MyPlanet Software—Anti Clipboard Logger and Mouse Only Keyboard (MOK)", [online]. [archived on Oct. 27, 2005]. Retrieved from the Internet: <URL: http://web.archive.org/web/20051027003358/http://www.myplanetsoft.com/free/mokhelp.php> , 3 pgs.

Van Eck, W., "Electromagnetic Radiation From Video Display Units: An Eavedropping Risk?", *Computers & Security*, 4(4), (1985), 269-286.

Zhuang, L., et al., "Keyboard Acoustic Emanations Revisited", *Proceedings of the 12th ACM Conference on Computer and Communications Security*, (2005), 373-382.

* cited by examiner

*Primary Examiner*—Kee M Tung
*Assistant Examiner*—Michelle K Lay
(74) *Attorney, Agent, or Firm*—Schwegman, Lundberg & Woessner, P.A.

(57) ABSTRACT

A system and method for displaying a glyph on a graphical user interface to protect the displayed glyph against eavesdropping. The method comprises providing multiple frames of the glyph, each frame representing a partial glyph which includes at least one component of the glyph. The multiple frames of the glyph may be displayed successively, at a predetermined frequency, on the graphical user interface so that a user observes the glyph by visually integrating the successive multiple frames of partial glyphs. The glyph may be a combination of glyphs including characters, keys or images which may represent an onscreen keyboard or keypad. The glyph may be moved across the graphical user interface and may further be obfuscated.

21 Claims, 5 Drawing Sheets

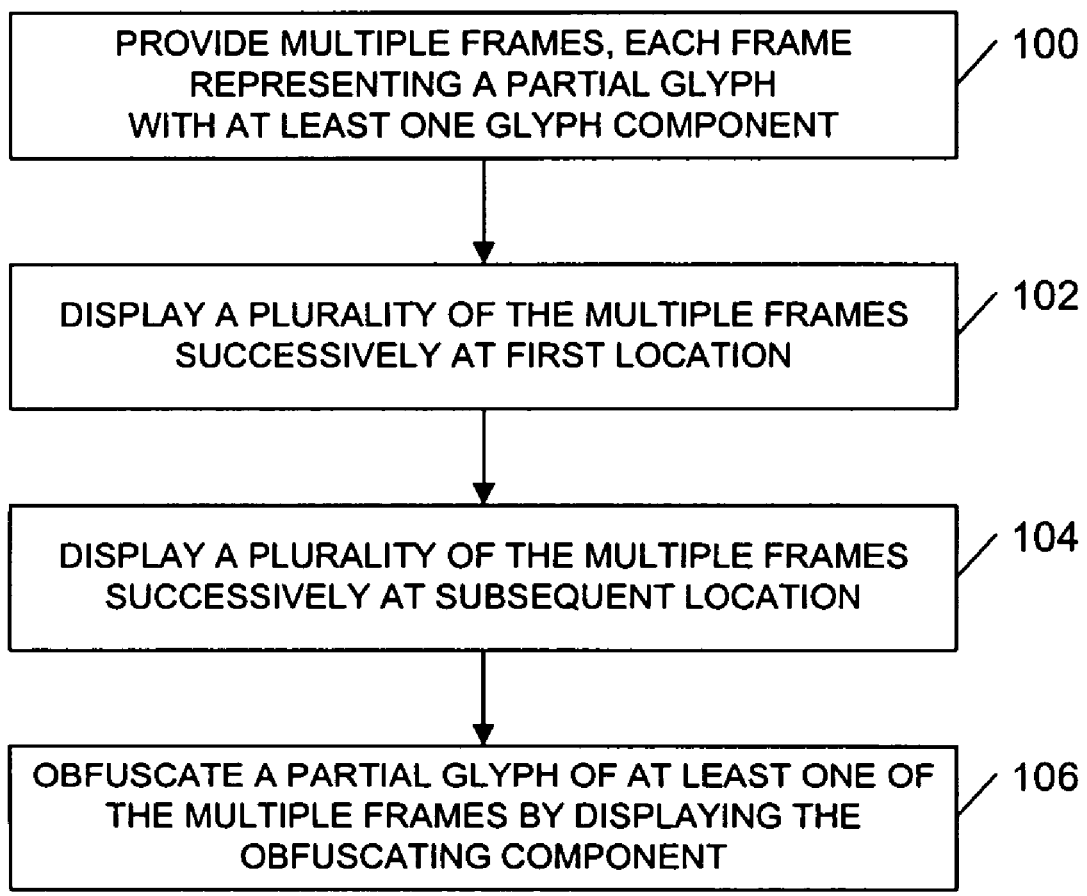

METHOD TO PROTECT DISPLAY TEXT FROM EAVESDROPPING

TECHNICAL FIELD

The present application relates to the field of displaying glyphs, for example characters, keys and/or images, on a graphical user interface. In an example embodiment, the application relates to a method and system of providing multiple frames of partial glyphs and displaying these frames successively to inhibit or prevent eavesdropping.

BACKGROUND

To evade eavesdropping in a network environment, information that travels over the network, and in particular over the Internet, is usually encrypted between endpoints of the network. However, information is typically unprotected between a user and the application used by a user, making the information susceptible for interception and eavesdropping.

For example, a user's input is vulnerable to various types of keystroke logging. Keystroke logging captures a user's keystrokes, typically to obtain passwords or encryption keys, thereby bypassing security measures of a system. Keystroke logging may be achieved by both hardware and software means. Some systems include devices which are attached to the keyboard cable and also devices which can be installed in keyboards. Software applications for keylogging are also easy to obtain and/or develop, and may be distributed as a trojan horse or as part of a virus or worm.

To address this problem on-screen keyboards have been developed. However, a problem that has been identified with existing on-screen keyboards is that a screen capture of the keyboard, in addition to the recording of mouse pointer coordinates, will still reveal what keys have been clicked by a user, thereby overcoming this security measure.

Information presented or displayed to the user on the screen of a computer, or on any other graphical user interface (GUI), may be subjected to screen capture of various kinds. Therefore, sensitive or confidential information, such as a password or banking details of a user, may be obtained whenever it is displayed on the screen.

BRIEF DESCRIPTION OF THE DRAWINGS

Embodiments are illustrated by way of example and not limitation in the figures of the accompanying drawings, in which like references indicate similar elements and in which:

FIG. 5 is a simplified flow diagram illustrating a method of displaying glyphs on a graphical user interface in accordance with an example embodiment;

DETAILED DESCRIPTION

The present application relates to a system and method for the display of glyphs on a graphical user interface (GUI) to inhibit or prevent eavesdropping of the displayed glyphs. The system and method provides added security measures when information, in the form of glyphs, is displayed on a GUI, whether the displayed information relates to, for example, an on-screen keyboard or keypad used to capture sensitive data, or alternatively, whether the information relates to sensitive information only displayed to the user.

The method and system may be of particular relevance to on-screen keyboards and keypads having a random key layout, where such a keyboard may be embedded in an application that prompts a user for a password.

Figure 1:
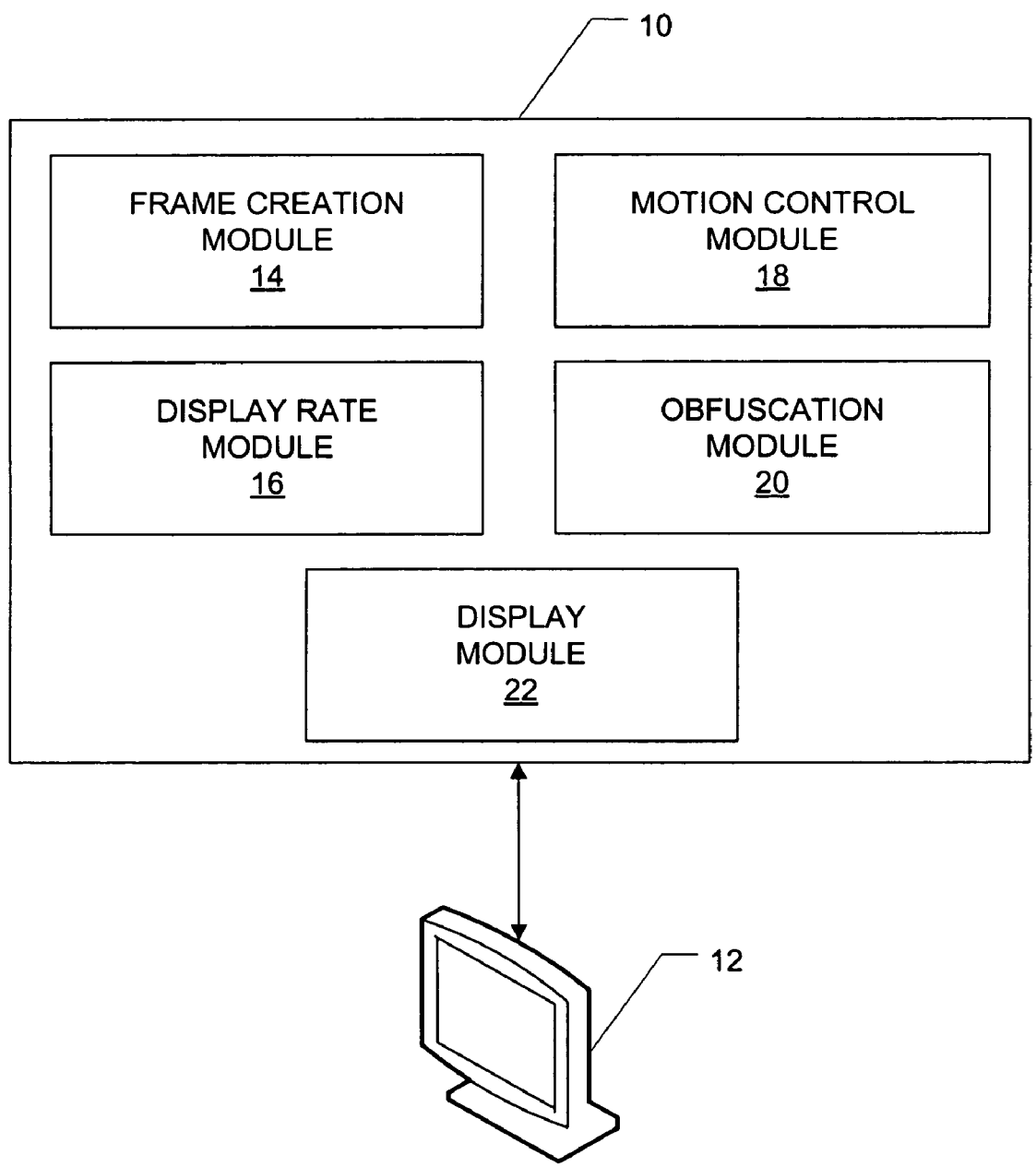
FIG. 1 is a block diagram illustrating a system for the display of glyphs on a graphical user interface in accordance with an example embodiment.

FIG. 1 shows an example embodiment of a system 10 for the display of glyphs on a display or GUI 12. The displayed glyphs may be any glyph or combination of glyphs including symbols, characters such as text characters, keys, for example the keys of an on-screen keyboard or keypad, and/or images.

The display or GUI 12 may be any type of GUI, for example a CRT (cathode ray tube) or LCD (liquid crystal display) used for the screen of a personal computer, such as a desktop or laptop, or the screen of a Personal Digital Assistant (PDA). In an example embodiment, the GUI 12 may be a bank terminal such as an Automatic Teller Machine (ATM) which provides self-service banking functions. The ATM may be a cash machine that allows a bank's customers to make cash withdrawals and check their account balances without the need for a human teller. Many ATMs also allow people to deposit cash or checks, transfer money between their bank accounts, top up their mobile phones' pre-paid accounts or even buy postage stamps.

The system 10 includes a frame creation module 14 to analyze a glyph or combination of glyphs and to break the glyphs into multiple frames. The frame creation module 14 thereby provides multiple frames, with each frame representing a partial glyph which includes at least one component 40 of the glyph (see FIG. 2).

Each separate frame of the glyph contains insufficient information or components to allow a viewer of any of the multiple frames to extrapolate the information contained in the frame thereby to discern the displayed glyph. This results in a single screenshot of the GUI which would comprise only one of the multiple frames representing a partial glyph, and thus not provide sufficient information for eavesdropping. However, when the multiple frames are superimposed and aligned, the original glyph can be discerned.

Figure 2A:
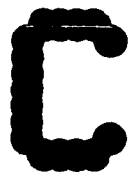
FIG. 2 comprises FIGS. 2A to 2F, with FIG. 2A showing an example embodiment of a glyph for the character "C", and FIGS. 2B to 2F showing multiple frames representing partial glyphs, the multiple frames when aligned showing the glyph for the character
Figure 2B:
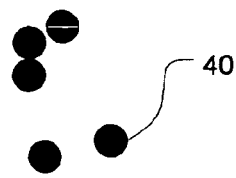
Figure 2C:
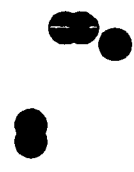
Figure 2D:
Figure 2E:
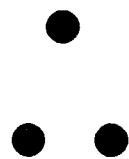
Figure 2F:

A simplified example of a glyph is the letter "C" as shown in FIG. 2A. The multiple frames for the letter "C", as provided by the frame creation module 14, are shown in FIGS. 2B to 2F. From each respective frame, which would typically be frames captured by a screenshot, an eavesdropper would not be able to determine that the glyph represents the letter "C", as each partial glyph contains too few components to extrapolate.

Glyphs may be broken up or divided into any type or number of components. Examples of types of component are dots, lines, pixels or the like. In the example embodiment shown in FIGS. 2B to 2F, the components of the glyphs are dots 40. It will be appreciated that the components of the partial glyphs need not all be of the same shape and size. Also, the type of component used in the partial glyphs may be dependent on the original glyph to be displayed. For example, if a very fine font is used for the glyph, it may be more appropriate to use lines or pixels for the components, rather than dots.

The system 10 may further include a display rate module 16 to manage the rate at which the multiple frames of the glyph are displayed successively, e.g., the frequency of the display. Typically the display rate module 16 provides a display module 22, to be described in more detail below, with a predetermined display rate frequency. The rate of display of the multiple frames of the glyph may be adjusted so as to limit visual discomfort of a user and may be dependent on the GUI, the glyphs to be displayed and the number of multiple frames of a glyph.

In the motion picture industry it has been determined that a frame rate of less than 16 frames per second causes the mind to see flashing images, which may be distracting to a viewer. However, in the motion picture industry, the aim is to see continuous movement, while the present application aims to provide a user with a visual perception of a complete glyph, while multiple frames of partial glyphs are displayed consecutively. In the application of the example method and system, a user's eyes may visually integrate the time-spaced multiple frames of partial glyphs displayed on the GUI to form the full original glyph.

From flicker problems experienced with computer monitors, it has been determined that a low refresh rate, less than 60 Hz, may cause a user to see flicker. Generally, a refresh rate of 75 Hz or above, used in most modem monitors, is considered flicker-free. As background, the refresh rate is the number of times in a second that a display is illuminated. This is distinct from the measure of frame rate in that the refresh rate includes the repeated illumination of identical frames, while frame rate measures how often a display can change from one image to another.

Flat-panel LCD monitors do not suffer from flicker even if their refresh rate is 60 Hz or even lower, since the light transmission changes in the liquid crystals are slower than that. While on smaller computer monitors (14") few people notice any change above 60-72 Hz. On larger monitors (17", 19") most people would experience mild discomfort unless the refresh rate is set to a more comfortable 85 Hz or higher. 100 Hz is comfortable for most people. Different operating systems set the default refresh rate differently, with Windows 95 and Windows 98 setting the highest possible refresh rate. Windows NT and Windows 2000 by default set the refresh rate to the lowest supported, usually 60 Hz. The aforementioned may be taken into account when selecting a display rate using the display rate module 16 of the system 10.

A motion control module 18 forms part of the system 10 and controls the overall motion of the glyphs across the GUI 12. The relative motion of the glyphs may be slight and may be in any direction. The movement of the glyphs makes it difficult for an eavesdropper to align multiple captured screenshots, which may make superimposing captured frames impractical, in particular as there is no reference point to align screen captures.

The motion control module 18 provides the display module 22, described in more detail below, with the speed and direction in which to sequentially move the glyphs across the GUI 12, from a first location on the GUI to a second location, and further to subsequent locations. Typically the speed and direction of the movement or motion are random, but within predefined parameters. The movement or random speed of the glyphs may be between a predetermined maximum and minimum speed. This ensures that the glyphs are not moved too rapidly across the GUI 12, thereby causing discomfort to the user and possibly blurring the glyph. Also, the speed should not be too slow, thereby obviating the move of the glyph across the GUI 12.

Figure 3:
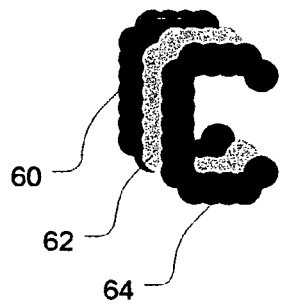
FIG. 3 shows the glyph for the character "C" of FIG. 2A, in a first, second and subsequent location, as moved across a graphical user interface, in accordance with an example embodiment of the method.

FIG. 3 shows the glyph "C", as shown in FIG. 2, in a first 60, second 62 and subsequent location 64 on the GUI 12, as moved by the display module 22 and motion control module 18.

The system 10 may optionally include an obfuscation module 20 which may be used to add a small number of obfuscation objects, such as dots or additional lines, to any of the multiple frames, thereby to obfuscate the displayed glyph. The obfuscation module 20 is aimed at providing the additional objects in spaces between or around the glyphs, for example spaces between characters or keys on an on-screen keyboard. In an example embodiment, the obfuscation module 20 may allow the obfuscation objects or dots to appear at a frequency lower than the display frequency of the multiple frames, thereby to ensure that the obfuscation objects do not interfere with the readability of the glyphs when the multiple frames are displayed successively. The obfuscation module 20 may display the obfuscation objects randomly on random multiple frames.

Figure 4A:
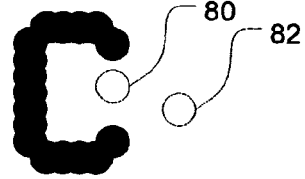
FIG. 4 comprises FIGS. 4A to 4F, with FIG. 4A being similar to FIG. 2A, but showing obfuscation objects in the multiple frames of the partial glyphs of FIGS. 4B to FIG. 4F, in accordance with an example embodiment of the method.
Figure 4B:
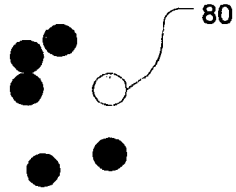
Figure 4C:
Figure 4D:
Figure 4E:
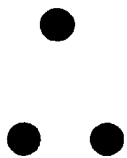
Figure 4F:

FIG. 4 shows the glyph "C" of FIG. 2, but with obfuscation objects 80 and 82 added between the components of the partial glyphs shown in the multiple frames of FIGS. 4B and 4F. These obfuscation objects 80 and 82 are also shown in the superimposed glyph of FIG. 4A.

The display module 22 is used to display the multiple frames, successively, at a first location on the GUI 12. The display module 22 obtains the multiple frames from the frame creation module 14 and displays the frames successively at the predetermined frequency stipulated by and received from the display rate module 16.

In an example embodiment, the display module 22 also receives information from the motion control module 18 to move the glyphs across the GUI 12 from a first location to a second location and, to subsequent locations. As mentioned, the information provided by the motion control module 18 may be the speed and direction of the movement of the glyph.

A first multiple frame of the glyph may be moved to a second location by the display module 22, once all the multiple frames have been displayed successively, at least once, at the first location. This may ensure that blurring of the glyph is limited and that the eyes of the user observes a sufficient number of frames to visually integrate the displayed multiple frames.

The display module 22 may further receive information from the obfuscation module 20 to add obfuscation objects to any of the multiple frames, thereby to obfuscate the displayed glyph.

Prior to receiving information from the motion control module 18 and the obfuscation module 20, the display module may first determine whether the glyph to be displayed on the GUI should be moved across the GUI and should be obfuscated.

FIG. 5 shows simplified flow diagram of a method of displaying glyphs in accordance with an example embodiment.

In operation 100, the frame creation module 14 provides the display module 22 with multiple frames which together, for example when superimposed, constitute a glyph to be displayed on the GUI 12. Each frame may represent a partial glyph with at least one glyph component.

The display module 22 displays a plurality of the multiple frames successively at a first location on the GUI 12, as shown in operation 102. As the partial glyphs are displayed in the same location at a particular display rate, aligning the multiple frames, the eyes of a user visually integrate the multiple frames and partial glyphs thereby to observe the complete superimposed glyph and not a sequence of partial glyphs.

In operation 104, a plurality of the multiple frames is displayed successively at a second location on the GUI 12, after being moved by the display module 22 from the first location to the second location, using information provided by the motion control module 18.

The glyph is obfuscated, as shown by operation 106, by the display module 22 by displaying obfuscating components on any of the multiple frames, around or between components of the glyph, in accordance with information received from the obfuscation module 20.

Figure 6:
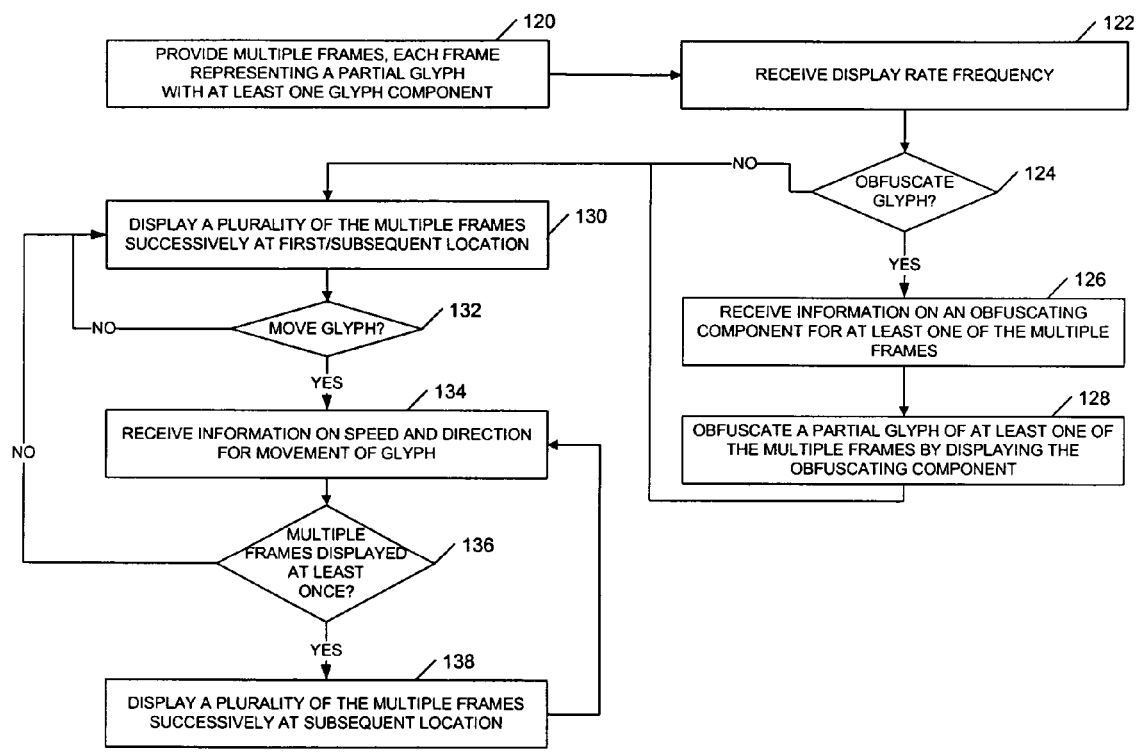
FIG. 6 shows a detailed flow diagram illustrating a method of displaying glyphs on a graphical user interface in accordance with an example embodiment.

Turning to FIG. 6, a detailed flow diagram of the operations of a method of displaying glyphs in accordance with an example embodiment is shown.

Similar to operation 100 of FIG. 5, the frame creation module 14 provides the display module 22 with multiple frames which together constitute a glyph to be displayed on the GUI 12, in operation 120. Each frame represents a partial glyph with at least one glyph component.

The display rate module 16 provides the display module 22 with the predetermined display rate frequency (shown in operation 122), which determines how many frames of the multiple frames constituting the displayed glyph will be displayed per second.

In operation 124, the display module determines whether the glyph to be displayed has to be obfuscated. This feature may be optional and preset in the system. For example, in certain applications of the system and method, it may be desirable not to obfuscate the glyph. If obfuscation is necessary, the display module 22 receives from the obfuscation module 20, in operation 126, information, typically relating to the type of obfuscating component, its position and frequency, for at least one of the multiple frames of the glyph.

The display module 22 uses this received information in operations 128 and 130 to obfuscate a partial glyph of one of the multiple frames, and thereby the displayed glyph, by displaying the obfuscating component in accordance with the received information.

If a glyph is not to be obfuscated, the glyph is displayed by the display module 22 (shown in operation 128) by displaying a plurality of the multiple frames successively at a first location on the GUI 12. As mentioned before, the multiple frames with the partial glyphs are displayed over each other, at the predefined display rate frequency and a visual illusion is created whereby a user will visually integrate the frames to observe the complete glyph and not a sequence of partial glyphs.

The display module 22 now determines, in operation 132, whether the glyph being displayed should be moved across the GUI 12. If it is determined that the glyph should be moved, the display module 22 may receive information on the speed and direction of such movement from the motion control module 18, in operation 134.

The display module 22 uses this information in operation 138 to display a plurality of multiple frames of the partial glyphs successively at a second or subsequent location. However, in an example embodiment, the display module 22 may first determine whether all the multiple frames which constitute the glyph have been displayed at least once at the prior location of the glyph, as shown in operation 136. As mentioned above, this feature may provide for a clearer displayed image.

The display of glyphs on GUI's according to the method and system attempts to defeat keystroke loggers, but may also be used as a defense against applications that capture a graphical text and use OCR algorithms to deduce the text.

Figure 7:
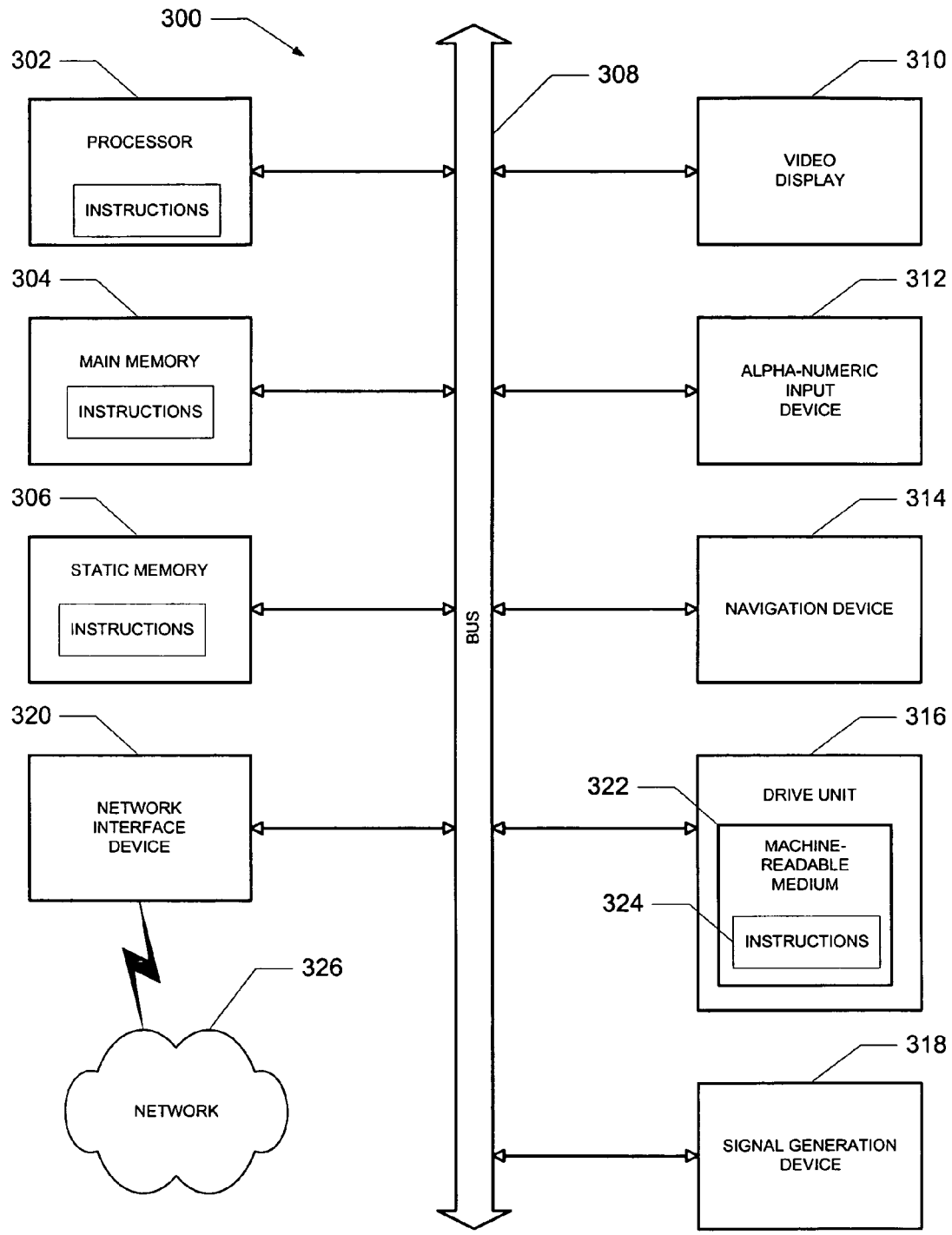
FIG. 7 is a block diagram showing a machine for performing any one of the exemplary methods described herein.

FIG. 7 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be an ATM, a personal computer (PC), a tablet PC, a set-top box (STB), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., TCP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium"shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, and optical and magnetic media.

Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of displaying a glyph on a graphical user interface, the method comprising:
   providing multiple frames of the glyph, each frame representing a partial glyph which includes at least one component of the glyph, the glyph not being discernable from any one of the multiple frames; and
   displaying a plurality of the multiple frames successively at a first location on the graphical user interface, so that a user observes the glyph by visually integrating the successive multiple frames of partial glyphs.

2. The method of claim 1, wherein the plurality of multiple frames are displayed at a predetermined display rate frequency.

3. The method of claim 1, further comprising displaying a plurality of the multiple frames of the glyph successively, at least a second location on the graphical user interface, thereby sequentially moving frames of the glyph across the graphical user interface.

4. The method of claim 3, wherein the plurality of multiple frames of the glyph is displayed at the at least one second location once all the multiple frames of the glyph have been displayed at the first location.

5. The method of claim 3, wherein the glyph is moved across the graphical user interface at a random speed.

6. The method of claim 5, wherein the random speed is selected between a predefined maximum and minimum speed.

7. The method of claim 1, further comprising obfuscating the glyph by displaying obfuscating components around or between components of any of the partial glyphs.

8. The method of claim 7, wherein the obfuscating components are displayed around or between components of the glyph at a frequency lower than the display rate frequency at which the multiple frames of the partial glyphs are displayed.

9. The method of claim 1, wherein the glyph is a combination of glyphs.

10. The method of claim 9, wherein the glyphs are selected from characters, keys and images.

11. The method of claim 10, wherein the characters are letters or numbers.

12. The method of claim 10, wherein the characters, keys or images represent an on-screen keyboard or keypad.

13. The method of claim 1, wherein the at least one component of the glyph is a dot, a line, or a pixel.

14. A system for displaying a glyph on a graphical user interface, the system comprising:
   a frame creation module to provide multiple frames of the glyph, each frame representing a partial glyph which includes at least one component of the glyph, the glyph not being discernable from any one of the multiple frames; and
   a display module configured to display the multiple frames of the glyph successively, at a predetermined display rate frequency, at a first location on the graphical user interface, so that a user observes the glyph by visually integrating the successive multiple frames of partial glyphs.

15. The system of claim 14, further comprising a display rate module to provide the display module with the predetermined display rate frequency to display the multiple frames of the glyph.

16. The system of claim 14, further comprising a motion control module to control the motion of the displayed glyph across the graphical user interface.

17. The system of claim 16, wherein the motion control module is configured to provide the display module with information on the speed and direction in which to move the multiple frames of the glyph from a first location to at least a second location on the graphical user interface.

18. The system of claim 16, wherein the speed in which to move the multiple frames is a random speed between a predefined maximum and minimum speed.

19. The system of claim 14, further comprising an obfuscating module to provide the display module with obfuscating components to be displayed around or between components of the glyph.

20. A system for displaying a glyph on a graphical user interface to protect the displayed glyph against eavesdropping, the system comprising:
   means for providing multiple frames of the glyph, each frame representing a partial glyph which includes at least one component of the glyph, the glyph not being discernable from any one of the multiple frames of the glyph; and
   means for displaying the multiple frames of the glyph successively, at a predetermined display rate frequency, at a first location on the graphical user interface, so that a user observes the glyph by visually integrating the successive multiple frames of partial glyphs.

21. A machine-readable medium embodying instructions to display a glyph on a graphical user interface, the instructions when executed by a machine cause the machine to:
   provide multiple frames of the glyph, each frame representing a partial glyph which includes at least one component of the glyph, the glyph not being discernable from any one of the multiple frames; and
   display a plurality of the multiple frames successively at a first location on the graphical user interface, so that a user observes the glyph by visually integrating the successive multiple frames of partial glyphs.

* * * * *

UNITED STATES PATENT AND TRADEMARK OFFICE
CERTIFICATE OF CORRECTION

PATENT NO. : 7,557,806 B2  Page 1 of 1
APPLICATION NO. : 11/363728
DATED : July 7, 2009
INVENTOR(S) : Mark K. Ng It is certified that error appears in the above-identified patent and that said Letters Patent is hereby corrected as shown below:

In column 1, line 56, after "character" insert -- "C"; --.

Signed and Sealed this

Twelfth Day of January, 2010

David J. Kappos
*Director of the United States Patent and Trademark Office*